B. VOLKMANN.
Wheel Plow.
No. 2,703. Reissued July 30, 1867.
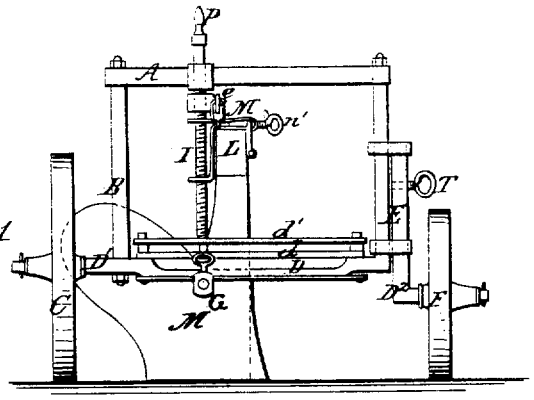
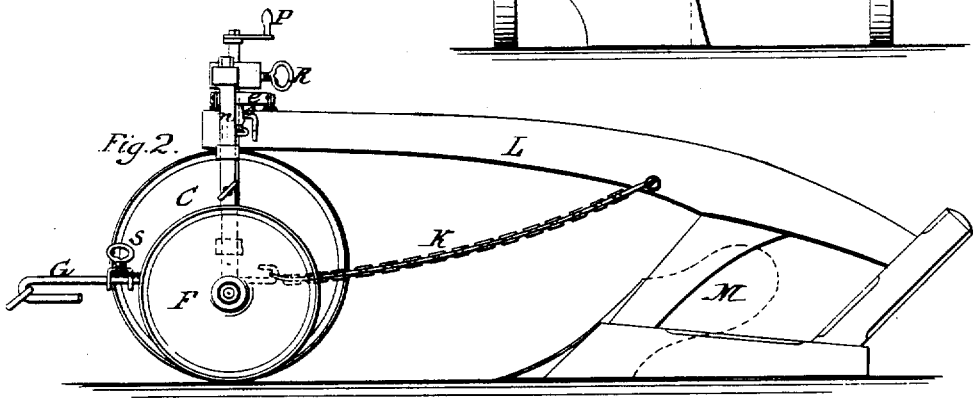
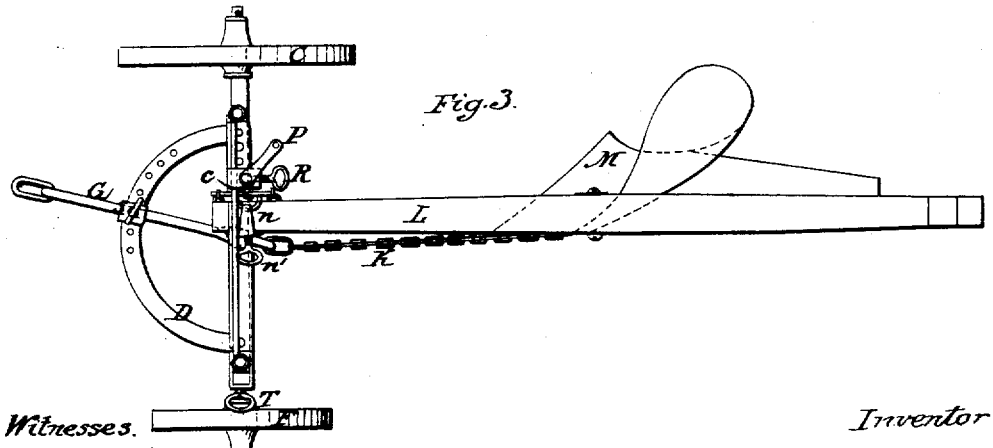
Witnesses.
Henry Wehle
Gustav Zimmermann
Inventor
Bruno Volkmann
N. PETERS, PHOTO-LITHOGRAPHER, WASHINGTON, D. C.

UNITED STATES PATENT OFFICE.

FREDERICK VOLKMAN, OF HOBOKEN, NEW JERSEY, ASSIGNEE OF BRUNO VOLKMANN.

IMPROVEMENT IN PLOWS.

Specification forming part of Letters Patent No. 60,095, dated November 27, 1866; Reissue No. 2,703, dated July 30, 1867.

*To all whom it may concern:*

Be it known that BRUNO VOLKMANN, of the city, county, and State of New York, did obtain Letters Patent for a new and Improved Plow, and that I, FREDERICK VOLKMAN, of Hoboken, Hudson county, New Jersey, assignee of said BRUNO VOLKMANN, do hereby declare that the following is a full, clear, and exact description thereof, which will enable others skilled in the art to make and use the same, reference being had to the accompanying drawings, forming part of this specification, in which—

Figure 1 is a front elevation of my improved plow. Fig. 2 is a side elevation of the same, and Fig. 3 is a plan or top view of the same.

Similar letters of reference indicate corresponding parts.

This invention relates to such a construction of the draft attachment of a plow that by its use the said plow will be perfectly self-adjusting, and will, when thrown out of the furrow by stones or other obstacles, at once resume its original position in the furrow without the aid of the driver.

The use of plow-handles is or may be altogether dispensed with on a plow that is provided with my improved draft attachment. The latter can be so adjusted that the depth, as well as the width, of the furrow may be increased or diminished at pleasure.

The invention consists in the construction and arrangement of a "plow-cart," and in the manner of securing the same to the plow-beam. The cart consists of a horizontal axle, on the right-hand end of which a large wheel is hung, while a smaller wheel is arranged on its other end, being hung on a frame that may be adjusted-up and down on the said axle, so as to more or less increase the difference of height of the two wheels, whereby, as the large wheel runs in the furrow, the depth of the furrow is regulated. The draft-bar is pivoted to the said axle by a pin or bolt, that fits through a hole in the axle, a number of such holes being provided in the latter to change the position of the bar. From the axle projects an upright screw-shaft, which passes through two nuts, of which the length may be adjusted at pleasure with the front end of the plow-beam, the said chain being secured to the left-hand side of the plow-beam. To the other upper nut is pivoted a balance-bar, both ends of which fit through chains that are secured to the right-hand side of the plow-beam. It may here be remarked that in naming the sides of the plow or plow-beam position is supposed to be taken in rear of the plow. By means of these connections the front end of the beam of an ordinary plow is secured to and hung in the aforesaid plow-cart. A third nut is arranged above the two aforementioned in a frame fixed stationary upon the axle of the cart. Thus, by turning the upright screw-shaft the height of the plow may be regulated. The lower end of the upright screw-shaft is fitted in the aforesaid axle in such a manner that it can be easily taken out and reset in one of a series of holes, which are provided for that purpose in the axle. The front end of the plow-beam can thus be set more or less to one or the other side, and the width of the furrow be thus regulated. To the rear end of the draft-bar, which projects but a little beyond the axle of the plow-cart, is secured the front end of a draft-chain, of which the other end is secured to the under side of the plow-beam, to the landside of the same, but little in front of the plow. The draft is thus directly applied by means of this chain, the attachment of the plow-beam in front being merely for the purpose of balancing the same and for adjusting its position. The front part of the draft-bar rests upon a semicircular or other plate, in which are holes or notches for holding the said draft-bar in any desired position, so that the same can be swung horizontally around its pivot, whereby the aforesaid draft-chain can be set at any desired angle, thereby increasing or diminishing the power, as well as regulating the width of the furrow at pleasure.

I will now proceed to describe the detail arrangements of my invention with reference to the annexed drawings.

D′ represents the axle of the plow-cart, on the right-hand end of which a wheel, C, is hung. On the left-hand end of the same is arranged a smaller wheel, F, which is hung on the horizontal arm of an L-shaped bar, $d^2$, the said bar being fitted by means of sleeves *a a* around an upright post, E, that projects vertically from the axle, as is clearly shown in Fig. 1. By means of a screw, T, the said wheel F can be secured in any desired position on the axle D′. From the right hand end of the axle projects, similar to the post E, an upright post, B, the upper ends of which posts B and E being connected by a horizontal bar, A, as shown above, and parallel with the axle D′. Around the bar A is fitted a sliding block, *b*, in which the upper part of an upright screw-shaft, I, is swiveled, the lower end of which screw-shaft being fitted swiveled in the axle D′, so as to turn loose in the same, and so that it may be easily raised therefrom. A number of holes are provided in the surface of the said axle, for the purpose of allowing, in conjunction with the sliding block *b*, the lateral adjustment of the screw I. By means of a set-screw, R, the block *b* can be secured in any desired position on the bar A. Below the block *b* are fitted around the screw I two nuts, *c*, and plate *f*, which are moved up and down on the screw-shaft when the same is turned by means of the crank or hand-wheel P. To the left-hand side of the upper nut, *c*, is pivoted the center of a metal bar, *e*, both ends of which are secured to the upper ends of short links *g*, that are secured to the right-hand side of the plow-beam L, and to the front end of the same, as is clearly shown in Fig. 2. The lower plate, *f*, is actually composed of two parts, which are connected by a bar, *f′*, at their left-hand side, as is clearly shown in Fig. 1. To the upper part of this bar *f′* is secured the end of links *n*, which are secured to the left-hand side of the plow-beam, and to the front end of the same, as shown in Fig. 1. One of the links of these links *n* is provided with a set-screw, *n′*, by means of which the two links passing through this screw-link can be more or less clamped together, whereby the length of the chain *n* can be very accurately regulated. It will be noticed that the screw-shaft I is arranged close to the front end and on the right-hand side of the plow-beam L.

G is the draft-bar, which passes through a slot in the axle D′, and is secured to the same by means of a bolt, *h*, Fig. 3, which passes through one of the set of holes that are provided in the plate *d* of the axle, as is clearly shown in Fig. 3.

D is a semicircular plate, projecting from the front of the axle D′, and is provided with a number of holes or notches, as shown. The front part of the draft-bar G rests upon the plate D, and swinging around its pivot *h*. This draft-bar can be secured in any desired angle by means of a set-screw or bolt or pin, S, and a clamp, S′. To the rear end of the draft-bar, which is but little in rear of the axle, as seen in Figs. 2 and 3, is secured the front end of a chain, K, the rear end of which is secured to the landside of the plow-beam, close to the under side of the same, and above the mold-board M, as is clearly shown in Fig. 2.

The axle D′ consists, as is shown in Fig. 1, of three parts or plates, D′, *d*, and *d′*. Between D and *d* is a slot for the draft-bar to pass through, and between *d* and *d′* is a slot for the purpose of permitting the handling of the bolts *h*. The draft-chain, when attached as described, and when the plow is being drawn ahead, presses the lower right-hand edge of the plow-beam against the plate *f′*, and would have the tendency to draw the upper right-hand edge of the said plow-beam off the plate *f′* if it were not for the adjustable links *n*, which keep that always against the plate *f′*. The mold-board is thereby always held and retained in proper position. Still, there is always a power applied to the mold-board through the chain K and draft-bar G, whereby it is pressed strongly against the soil on the right-hand side, so that the soil taken up by the plow is forced around the mold-board, or rather is made to force its passage over the mold-board with such power that it will be most completely crumbled by this action.

This plow is not to be guided in the rear by the driver, and need therefore not be provided with handles for that purpose.

The power given to the mold-board by my improved method of hanging the plow-beam and attaching the draft-chain is far greater than any power that can be applied by the man in rear. Should the plow be thrown out of the furrow by means of stones or other obstacles, it will be at once returned into its proper position by the draft-chain, provided the cart is well guided in the furrow in such a manner that the wheel C moves close to the outer edge of the furrow within the latter. The plow-beam is by means of the links *n* and *g* secured to the cart in such a flexible manner that it can be easily turned in either direction whenever desired. When turning to start a new furrow, the plow will be raised out of ground as the wheel C leaves the furrow.

Instead of the screw-shaft I, an upright round or square bar may be substituted, which may be provided with notches or holes, to adjust the nuts *c* and *f* on it.

Instead of having the wheel F adjustable on the end of the axle, it may be hung directly on the end of the said axle, and sets of wheels of different diameters be kept for the purpose of adjusting the depth of the furrow.

Having thus described the invention, what I claim as new, and desire to secure by Letters Patent, is—

1. A plow-cart that is made and operating substantially as and for the purpose herein shown and described.

2. The device for raising and lowering the front end of the plow-beam L by means of the screw-shaft I, fitted in the axle D and sliding block *b*, the nut *c*, and plate *f*, balance-bar *e*, links *g* and *n*, all made and operating substantially as herein shown and described.

3. The adjustable links *n*, when so made by the application of a set-screw, *n'*, substantially as and for the purpose herein shown and described.

4. The draft-chain K, attached to the under side of the plow-beam and to the landside of the same—or, in other words, to the lower left-hand edge of the same—substantially as and for the purpose herein shown and described.

5. The perforated axle D', in combination with the frame B A E and sliding block *b*, for the purpose of allowing the lateral adjustment of the screw-shaft I or its equivalent, substantially as and for the purpose herein shown and described.

6. The manner herein shown and described of adjustably securing the draft-bar G to the plow-cart by means of the perforated axle D', bolt *h*, and semicircular front plate, D, and pin or set-screw S, all made and operating substantially as herein shown and described.

7. In combination with the device for adjusting the plow-beam up and down, the wheel F of the cart when so arranged that by its adjustment the axle of the cart can be sunk more or less, as set forth.

8. Hanging the front end of the plow-beam directly to the screw-shaft I by means of links *g g*, balance-bar *e*, and nut *c*, all made and operating substantially as herein shown and described.

9. The draft-chain K, when secured to the plow in the manner described, in combination with the laterally, as well as obliquely, adjustable draft-bar G, as set forth.

F. VOLKMAN.

Witnesses:
A. V. BRIESEN,
WM. F. MCNAMARA,
ALEX. F. ROBERTS.